United States Patent
Mizutani et al.

(10) Patent No.: US 8,273,432 B2
(45) Date of Patent: Sep. 25, 2012

(54) AUTOMOTIVE FUEL HOSE

(75) Inventors: Koji Mizutani, Ichinomiya (JP); Kazutaka Katayama, Kasugai (JP); Takehiko Taguchi, Nagoya (JP)

(73) Assignee: Tokai Rubber Industries, Ltd., Komaki-shi, Aichi (JP)

(*) Notice: Subject to any disclaimer, the term of this patent is extended or adjusted under 35 U.S.C. 154(b) by 135 days.

(21) Appl. No.: 12/919,078

(22) PCT Filed: Oct. 29, 2009

(86) PCT No.: PCT/JP2009/068574
§ 371 (c)(1),
(2), (4) Date: Aug. 24, 2010

(87) PCT Pub. No.: WO2010/050549
PCT Pub. Date: May 6, 2010

(65) Prior Publication Data
US 2011/0000571 A1      Jan. 6, 2011

(30) Foreign Application Priority Data
Oct. 31, 2008    (JP) ................. 2008-280733

(51) Int. Cl.
B32B 1/08     (2006.01)
F16L 11/00    (2006.01)
F16L 11/04    (2006.01)
F16L 9/14     (2006.01)

(52) U.S. Cl. .............. 428/36.91; 138/137; 138/141

(58) Field of Classification Search ........... 428/35.7, 428/36.1, 36.2, 36.4, 36.6, 36.7, 36.8, 36.9, 428/36.91; 138/118, 137–139, 140, 141, 138/143, 145
See application file for complete search history.

(56) References Cited

U.S. PATENT DOCUMENTS
6,485,806 B1    11/2002  Tateyama et al.
2005/0067035 A1  3/2005  Suzuki et al.

FOREIGN PATENT DOCUMENTS
JP    10-138372 A     5/1998
JP    2005-127503 A   5/2005
JP    2007-270877 A  10/2007
JP    2008-111063 A   5/2008

OTHER PUBLICATIONS

Notification of Transmittal of Translation of the International Preliminary Report on Patentability (Form PCT/IB/338) of International Application No. PCT/JP2009/068574 mailed Jun. 16, 2011 with Forms PCT/IB/373 and PCT/ISA/237.
Internation Search Report of PCT/JP2009/068574, date of mailing Dec. 8, 2009.

*Primary Examiner* — Walter B Aughenbaugh
(74) *Attorney, Agent, or Firm* — Westerman, Hattori, Daniels & Adrian, LLP

(57) ABSTRACT

An automotive fuel hose is disclosed including an inner layer, an intermediate layer and an outer layer provided in this order on an outer peripheral surface of an innermost layer of a fluororesin. The inner layer and the outer layer each include of an amine-modified polyamide resin, where the intermediate layer is a resin composition including the following components: (A) a polyphenylenesulfide resin as a major component; (B) an acid-modified polyolefin resin; (C) an unmodified polyolefin resin; and (D) an epoxy resin. The proportion of the component (B) in the resin composition is 4 to 12 wt % and the proportion of the component (C) in the resin composition is 4 to 12 wt %, wherein the proportion of the component (D) in the resin composition is 1.5 to 5 wt %.

6 Claims, 1 Drawing Sheet

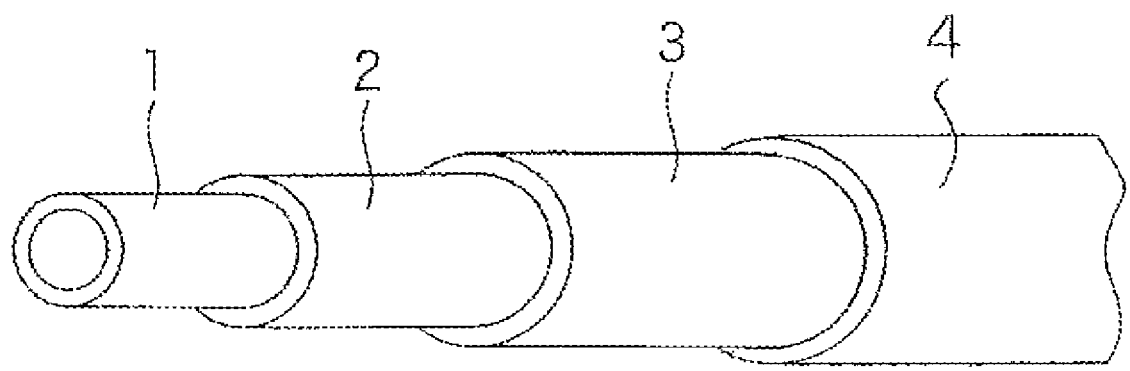

AUTOMOTIVE FUEL HOSE

TECHNICAL FIELD

The present invention relates to an automotive fuel hose and, more specifically, to an automotive fuel hose to be used for transporting an automotive fuel such as gasoline, alcohol-containing gasoline or diesel gasoline.

BACKGROUND OF THE INVENTION

With growing worldwide awareness of environmental issues, the control of the amount of hydrocarbon vapor emission from an automotive fuel hose or the like has been enhanced. Particularly in the United States, stringent regulations against vapor emission have recently come into effect. To cope with hydrocarbon vapor emission control in this situation, multilayer hoses have been proposed which include an intermediate layer composed of a fluororesin.

Such a multilayer hose employing the fluororesin is excellent in fuel permeation resistance to gasoline containing alcohol such as methanol and ethanol. To satisfy a stricter fuel permeation resistance requirement, the thickness of the fluororesin layer should be increased, resulting in correspondingly higher costs of the hose.

Polyphenylenesulfide (PPS) resins, which are better in fuel permeation resistance than the fluororesin, are attractive. Such a PPS resin has excellent fuel permeation resistance and, therefore, a layer composed of the PPS resin has satisfactory permeation resistance even if having a relatively small thickness. Accordingly, a hose including an intermediate layer composed of the P resin is more advantageous in costs than a hose including the intermediate layer of the fluororesin. As an example of the hose including the intermediate layer of a PPS resin, a fuel hose has been proposed which includes an intermediate layer of a PPS resin and a layer of a non-PPS thermoplastic resin (polyamide resin or the like) provided on an outer peripheral surface of the intermediate layer (see, for example, JP-A-2008-111063).

In the fuel hose disclosed in JP-A-2008-111063, an adhesive layer composed of a composition containing a PPS resin, a polyamide resin, a thermoplastic resin having a functional group and an uncrosslinked elastomer is provided between the layer of the PPS resin composition (PPS resin layer) and the layer of the polyamide resin composition (polyamide resin layer) to bond the PPS resin layer and the polyamide resin layer. However, interlayer adhesiveness between the PPS resin layer and the polyamide resin layer is disadvantageously poor, because the PPS resin layer and the polyamide resin layer of the fuel hose are merely bonded to each other due to the affinity of the PPS resin layer for the PPS resin in the adhesive layer and the affinity of the polyamide resin layer for the polyamide resin in the adhesive layer. Further, the PPS is excellent in fuel permeation resistance, but poor in flexibility. Therefore, the fuel hose disclosed in JP-A-2008-111063 is disadvantageously poor in flexibility, because the PPS resin layer is provided as the intermediate layer and, in addition, the adhesive layer contains the PPS.

SUMMARY OF INVENTION

In view of the foregoing, an automotive fuel hose excellent in interlayer adhesiveness and flexibility is disclosed.

An automotive fuel hose disclosed includes an inner layer, an intermediate layer and an outer layer provided in this order on an outer peripheral surface of an innermost layer of a fluororesin, wherein the inner layer and the outer layer are each composed of an amine-modified polyamide resin, wherein the intermediate layer is composed of a resin composition comprising the following components (A) to (D):
(A) a polyphenylenesulfide resin as a major component;
(B) an acid-modified polyolefin resin;
(C) an unmodified polyolefin resin; and
(D) an epoxy resin,
wherein the proportion of the component (B) in the resin composition is 4 to 12 wt % and the proportion of the component (C) in the resin composition is 4 to 12 wt %, wherein the proportion of the component (D) in the resin composition is 1.5 to 5 wt %, wherein the total proportion of the components (B) and (C) is 12 to 24 wt % and the mixing weight ratio of the components (B) and (C) is (B)/(C)=3/1 to 1/3, wherein the intermediate layer is bonded to the inner layer and the outer layer through a chemical reaction.

Intensive studies were conducted to provide an automotive fuel hose excellent in interlayer adhesiveness and flexibility. It was found that, where a hose including an intermediate layer formed by using a specific resin composition containing a polyphenylenesulfide (PPS) resin, an acid-modified polyolefin resin, an unmodified polyolefin resin and an epoxy resin in predetermined proportions and having a sandwich structure with the intermediate layer being held between an inner layer and an outer layer each composed of an amine-modified polyamide resin is produced by forming the three layers by coextrusion, excellent interlayer adhesiveness and flexibility can be achieved. More specifically, a functional group of the epoxy resin or a functional group of the acid-modified polyolefin resin in the intermediate layer chemically reacts with a terminal group of the amine-modified polyamide resin in the inner layer due to heat applied during the coextrusion in the production of the hose, so that the intermediate layer is firmly bonded to the inner layer. This improves interlayer adhesiveness between the intermediate layer and the inner layer in contact with the intermediate layer (inner layer/intermediate layer adhesiveness). Further, a terminal group of the amine-modified polyamide resin in the outer layer chemically reacts with the functional group of the epoxy resin or the functional group of the acid-modified polyolefin resin in the intermediate layer due to the heat applied during the coextrusion, so that the outer layer is firmly bonded to the lower fuel permeability layer. This improves interlayer adhesiveness between the intermediate layer and the outer layer in contact with the intermediate layer (intermediate layer/outer layer adhesiveness). The flexibility of the hose is also improved, because the unmodified polyolefin resin is used in addition to the acid-modified polyolefin resin for the specific resin composition for the intermediate layer. This improves interlayer adhesiveness between the lower fuel permeability layer and the inner layer in contact with the lower fuel permeability layer (inner layer/lower fuel permeability layer adhesiveness). Further, a terminal group of the amine-modified polyamide resin in the outer layer chemically reacts with the functional group of the epoxy resin or the functional group of the acid-modified polyolefin resin in the lower fuel permeability layer due to the heat applied during the coextrusion, so that the outer layer is firmly bonded to the lower fuel permeability layer. This improves interlayer adhesiveness between the lower fuel permeability layer and the outer layer in contact with the lower fuel permeability layer (lower fuel permeability layer/outer layer adhesiveness). In the present invention, the flexibility of the hose is also improved, because the unmodified polyolefin resin is used in addition to the acid-modified polyolefin resin for the specific resin composition for the lower fuel permeability layer.

The disclosed automotive fuel hose has improved interlayer adhesiveness between the intermediate layer and the inner layer in contact with the intermediate layer (inner layer/intermediate layer adhesiveness), because the intermediate layer and the inner layer are firmly bonded to each other through the chemical reaction of the functional group of the epoxy resin or the functional group of the acid-modified polyolefin resin in the intermediate layer with the terminal group of the amine-modified polyamide resin in the inner layer due to the heat applied during the coextrusion. Further, the disclosed automotive fuel hose has improved interlayer adhesiveness between the intermediate layer and he outer layer in contact with the intermediate layer (intermediate layer/outer layer adhesiveness), because the intermediate layer and the outer layer are firmly bonded to each other through the chemical reaction of the terminal group of the amine-modified polyamide resin in the outer layer with the functional group of the epoxy resin or the functional group of the acid-modified polyolefin resin in the intermediate layer due to the heat applied during the coextrusion. Therefore, the disclosed automotive fuel hose is simpler in layered structure and less costly without the need for provision of an adhesive layer. Further, the disclosed automotive fuel hose has improved flexibility, because the unmodified polyolefin resin is used in addition to the acid-modified polyolefin resin for the specific resin composition for the intermediate layer. In the disclosed automotive fuel hose, the innermost layer and the inner layer are provided on an inner peripheral surface of the intermediate layer composed of the specific resin composition. Without the possibility that the PPS resin directly contacts sour gasoline, the automotive fuel hose has excellent sour-gasoline resistance, while maintaining fuel permeation resistance intrinsic to the PPS resin. Further, the disclosed automotive fuel hose is excellent in shock resistance, because the automotive fuel hose has a sandwich structure such that the intermediate layer composed of the specific resin composition is held between the inner layer and the outer layer.

Where the acid-modified polyolefin resin (B) is at least one of an ethylene-α-olefin copolymer modified with maleic anhydride and an ethylene-α-olefin copolymer modified with maleic acid, the interlayer adhesiveness is further improved.

Where the unmodified polyolefin resin (C) is an ethylene-α-olefin copolymer, the flexibility is further improved.

Where the epoxy resin (D) is an o-cresol novolak epoxy resin, the interlayer adhesiveness is further improved.

Where the fluororesin for the innermost layer is a fluororesin having a functional group, interlayer adhesiveness between the innermost layer and the inner layer composed of the amine-modified polyamide resin is further improved.

Where the inner layer, the intermediate layer and the outer layer are formed by coextrusion, the chemical reaction is promoted by the heat applied during the coextrusion, thereby further improving the interlayer adhesiveness.

BRIEF DESCRIPTION OF DRAWING

FIG. 1 is a structural diagram showing an exemplary automotive fuel hose.

DETAILED DESCRIPTION OF THE INVENTION

Embodiments of the automotive fuel hose will next be described in detail.

As shown in FIG. 1, an automotive fuel hose includes an inner layer 2, an intermediate layer 3 and an outer layer 4 provided in this order on an outer peripheral surface of a tubular innermost layer 1 in which fuel flows.

The inner layer 2 and the outer layer 4 are each composed of an amine-modified polyamide resin, and the intermediate layer 3 is composed of a resin composition containing the following components (A) to (D):
(A) a polyphenylenesulfide resin as a major component;
(B) an acid-modified polyolefin resin;
(C) an unmodified polyolefin resin; and
(D) an epoxy resin.

The proportion of the component (B) in the resin composition is 4 to 12 wt %, and the proportion of the component (C) in the resin composition is 4 to 12 wt %. The proportion of the component (D) in the resin composition is 1.5 to 5 wt %. The total proportion of the components (B) and (C) is 12 to 24 wt %, and the mixing weight ratio of the components (B) and (C) is (B)/(C)=3/1 to 1/3. The intermediate layer is bonded to the inner layer and the outer layer through a chemical reaction.

A fluororesin is used as a material (innermost layer material) for the innermost layer 1 of the inventive automotive fuel hose. Examples of the fluororesin include ethylene-tetrafluoroethylene copolymers (ETFE), vinylidene fluoride-tetrafluoroethylene-hexafluoropropylene copolymers (THV), polyvinyl fluorides (PVF), polyvinylidene fluorides (PVDF), tetrafluoroethylene-hexafluoropropylene copolymers (FEP), tetrafluoroethylene-perfluoroalkylvinyl ether copolymers (PFA), polychlorotrifluoroethylenes (CTFE), ethylene-chlorotrifluoroethylene copolymers (ECTFE), vinylidene fluoride-hexafluoropropylene copolymers, hexafluoropropylene-perfluoroalkylvinyl ether copolymers, vinylidene fluoride-perfluoroalkylvinyl ether copolymers, tetrafluoroethylene-hexafluoropropylene-perfluoroalkylvinyl ether copolymers, ethylene-tetrafluoroethylene-hexafluoropropylene copolymers, vinylidene fluoride-tetrafluoroethylene-perfluoroalkylvinyl ether copolymers, vinylidene fluoride-hexafluoropropylene-perfluoroalkylvinyl ether copolymers, vinylidene fluoride-tetra fluoroethylene-hexafluoropropylene-perfluoroalkylvinyl ether copolymers, ethylene-tetrafluoroethylene-perfluoroalkylvinyl ether copolymers, ethylene-hexafluoropropylene-perfluoroalkylvinyl ether copolymers, ethylene-tetrafluoroethylene-hexafluoropropylene-perfluoroalkylvinyl ether copolymers, vinylidene fluoride-chlorotrifluoroethylene copolymers and vinylidene fluoride-tetrafluoroethylene copolymers, which may be used either alone or in combination. Among these, ETFE is preferred in terms of workability.

For adhesiveness between the innermost layer 1 and the inner layer 2, a fluororesin having a functional group is preferably used as the innermost layer material. The functional group is preferably a reactive functional group which reacts directly with a functional group of the amine-modified polyamide resin in the inner layer 2, and examples of the reactive functional group include a carboxylic anhydride residue and a carboxylic group.

The fluororesin having the functional group may be prepared, for example, by grafting a compound having the functional group to a fluororesin, or by copolymerizing a compound having the functional group with a fluororesin to bond the compound to a main chain or a terminal of the fluororesin.

The innermost layer material may contain an electrically conductive agent, as required, in addition to the fluororesin. Examples of the electrically conductive agent include carbon blacks, carbon nano-tubes, metal fibers, metal powders and metal oxide powders, which may be used either alone or in combination.

The amine-modified polyamide resin is used as a material (inner layer material) for the inner layer 2 to be formed on the outer peripheral surface of the innermost layer 1. Examples of the amine-modified polyamide resin include polyamide resins modified with aliphatic diamines such as 1,6-hexamethylenediamine, trimethylhexamethylenediamine, 1,4-diaminobutane, 1,3-diaminopropane, ethylenediamine and polyether diamines, aliphatic diamine carbamates such as hexamethylenediamine carbamate and ethylenediamine carbamate, aliphatic polyamines such as diethylenetriamine, triethylenetetramine, tetraethylenepentamine, pentaethylenehexamine, ethylaminoethylamine, methylaminopropylamine, 2-hydroxyethylaminopropylamine, aminoethylethanolamine, 1,2-bis(3-aminopropoxy)-2,2-dimethylpropane, 1,3,6-trisaminomethylhexane, iminobispropylamine, methyliminobispropylamine and bis(hexamethylene)triamine, alicyclic polyamines such as menthanediamine, N-aminoethylpiperazine, 1,3-diaminocyclohexane, isophoronediamine and bis(4-amino-3-methylcyclohexyl)methane, aliphatic polyamines having an aromatic ring such as m-xylylenediamine and tetrachloro-p-xylylenediamine, aromatic amines such as m-phenylenediamine, diaminodiphenyl ether, 4,4'-methylenedianiline, diaminodiphenyl sulfone, benzidine, 4,4'-bis(o-toluidine), 4,4'-thiodianiline, o-phenylenediamine, dianisidine, methylene bis(o-chloroaniline), 2,4-toluenediamine, bis(3,4-diaminophenyl) sulfone, diaminoditolyl sulfone, 4-chloro-o-phenylenediamine, 4-methoxy-6-methyl-m-phenylenediamine and m-aminobenzylamine, silicon-containing polyamines such as 1,3-bis(γ-aminopropyl)-1,1,3,3-tetramethyldisiloxane, amine-modified silicone oil, butadiene-acrylonitrile copolymers having a terminal functional group of amine, tertiary amine compounds such as N,N,N',N'-tetramethylhexamethylenediamine and N,N,N',N'',N''-pentamethyldiethyltriamine, ethylene copolymers containing an ethylene unit and an N,N-dialkylaminoalkyl α,β-unsaturated carboxylate unit (e.g., copolymers of ethylene and N,N-dimethylaminomethyl methacrylate), ethylene copolymers containing an ethylene unit and an N,N-dialkylaminoalkyl α,β-unsaturated carboxyamide unit (e.g., copolymers of ethylene and N,N-dimethylaminopropylacrylamide), dihydrazide compounds such as succinic dihydrazide, adipic dihydrazide, isophthalic dihydrazide and eicosanedioic dihydrazide, and polymer compounds such as of diaminomaleonitrile and melamine. These may be used either alone or in combination.

Examples of the polyamide resins to be modified with the amines include polyamide 46 (PA46), polyamide 6 (PA6), polyamide 66 (PA66), polyamide 99 (PA99), polyamide 1010 (PA1010), polyamide 610 (PA610), polyamide 612 (PA612), polyamide 11 (PA11), polyamide 912 (PA912), polyamide 12 (PA6), copolymers of polyamide 6 and polyamide 66 (PA6/PA66), copolymers of polyamide 6 and polyamide 12 (PA6/PA12), and aromatic polyamide resins such as polyhexamethylenediamine terephthalamides, polyhexamethylene isophthalamides and xylene-containing polyamides, which may be used either alone or in combination.

Among the amine-modified polyamide resins described above, the amine-modified PA12 is preferred for adhesion to the intermediate layer 3.

The specific resin composition as a material (lower permeability layer material) for the intermediate layer 3 to be formed on the outer peripheral surface of the inner layer 2 contains the polyphenylenesulfide resin (A) as the major component, the acid-modified polyolefin resin (B), the unmodified polyolefin resin (C) and the epoxy resin (D).

The polyphenylenesulfide (PPS) resin (A) as the major component of the specific resin composition has a structural unit, for example, represented by the following general formula (1):

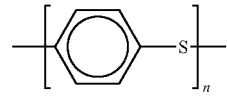

wherein n is a positive number.

The PPS resin (A) preferably contains the structural unit represented by the above general formula (1) in a proportion of not less than 70 mol %, particularly preferably not less than 90 mol %, for heat resistance.

The PPS resin (A) may have a functional group in the molecular structure (at a terminal of the molecule). Examples of the functional group include an epoxy group, a hydroxyl group, a carboxylic anhydride residue, a carboxylic group, an acrylate group, a carbonate group and an amino group.

Usable as the acid-modified polyolefin resin (B) is, for example, a polyolefin resin modified with an acid functional group such as a carboxyl group or a salt thereof, a carboxylate group or an acid anhydride group.

The polyolefin resin to be acid-modified is preferably an α-olefin copolymer. Examples of the α-olefin copolymer include copolymers of ethylene or propylene and an α-olefin such as ethylene, propylene, 1-butene, 1-pentene, 1-hexene, 1-heptene, 1-octene, 1-nonene and 1-decene. More specifically, ethylene-α-olefin copolymers are preferred.

Among the acid-modified polyolefin resins (B) described above, ethylene-α-olefin copolymers modified with maleic anhydride and ethylene-α-olefin copolymers modified with maleic acid are preferred for interlayer adhesiveness.

The unmodified polyolefin resin (C) is preferably, for example, an α-olefin copolymer. Examples of the α-olefin copolymer include those described for the acid-modified polyolefin resin (B).

The epoxy resin (D) is preferably a multifunctional epoxy resin. The multifunctional epoxy resin herein means an epoxy resin having a total of two or more epoxy groups in its molecule. Examples of the multifunctional epoxy resin include glycidylamine epoxy resins, triphenylglycidylmethane epoxy resins, tetraphenylglycidylmethane epoxy resins, aminophenol epoxy resins, diamidodiphenylmethane epoxy resins, phenol novolak epoxy resins, o-cresol novolak epoxy resins, bisphenol-A novolak epoxy resins and glycidyl ether epoxy resins, which may be used either alone or in combination. Among these, the o-cresol novolak epoxy resins are preferred for interlayer adhesiveness.

The proportions of the acid-modified polyolefin resin (B), the unmodified polyolefin resin (C) and the epoxy resin (D) in the specific resin composition are 4 to 12 wt %, 4 to 12 wt % and 1.5 to 5 wt %, respectively. Particularly, it is preferred that the proportions of the acid-modified polyolefin resin (B), the unmodified polyolefin resin (C) and the epoxy resin (D) are 6 to 10 wt %, 6 to 10 wt % and 2 to 4 wt %, respectively. If the proportion of the acid-modified polyolefin resin (B) is too small, the interlayer adhesiveness is deteriorated. On the other hand, if the proportion of the acid-modified polyolefin resin (B) is too great, the resulting hose is harder and less flexible. If the proportion of the unmodified polyolefin resin (C) is too small, the unmodified polyolefin resin (C) fails to serve as a compatibilizer, resulting in poorer flexibility of the hose. On the other hand, if the proportion of the unmodified polyolefin resin (C) is too great, the interlayer adhesiveness is deteriorated. Further, if the proportion of the epoxy resin (D) is too small, the interlayer adhesiveness is deteriorated. On the other hand, if the proportion of the epoxy resin (D) is too great, an unreacted portion of the epoxy resin is liable to remain as an inclusion, leading to cracking of the hose.

The total proportion of the acid-modified polyolefin resin (B) and the unmodified polyolefin resin (C) is 12 to 24 wt %, preferably 14 to 20 wt %. If the total proportion of the components (B) and (C) is too small, the flexibility is poorer. On the other hand, if the total proportion of the components (B) and (C) is too great, the fuel permeation resistance (fuel barrier property) is poorer.

The mixing ratio (mixing weight ratio) of the acid-modified polyolefin resin (B) and the unmodified polyolefin resin (C) is (B)/(C)=3/1 to 1/3, preferably (B)/(C)=2/1 to 1/2. If the mixing ratio of the component (B) is too great (the mixing ratio of the component (C) is too small), the flexibility is poorer. On the other hand, if the mixing ratio of the component (B) is too small (the mixing ratio of the component (C) is too great), the interlayer adhesiveness is poorer.

The proportion of the polyphenylenesulfide resin (A) as the major component is determined by subtracting the proportions of the acid-modified polyolefin resin (B), the unmodified polyolefin resin (C) and the epoxy resin (D) from the specific resin composition. Where the specific resin composition contains other components in addition to the components (A) to (D), the proportion of polyphenylenesulfide resin (A) is determined by subtracting the proportions of the components (B) to (D) and the other components from the specific resin composition.

As required, a plasticizer, a crystal nucleating agent, a heat stabilizer, a lubricant, a colorant, a flame retarder, a foaming agent, a release agent and the like may be added to the components (A) to (D) of the specific resin composition.

Any of the amine-modified polyamide resins for the inner layer material is used as a material (outer layer material) for the outer layer 4 to be formed on the outer peripheral surface of the intermediate layer 3.

Among the amine-modified polyamide resins described above, the amine-modified PA12 is preferred for adhesiveness to the intermediate layer 3.

The automotive fuel hose shown in FIG. 1 is produced, for example, in the following manner. The innermost layer material, the inner layer material, the intermediate layer material and the outer layer material described above are prepared. These materials are respectively extruded from an innermost layer extruder, an inner layer extruder, an intermediate layer extruder and an outer layer extruder into a single die for coextrusion, and a melt tube resulting from the coextrusion is passed through a sizing die, whereby the automotive fuel hose is produced as having a four layer structure including the inner layer 2 provided on the outer peripheral surface of the tubular innermost layer 1, the intermediate layer 3 provided on the outer peripheral surface of the inner layer 2 and the outer layer 4 provided on the outer peripheral surface of the intermediate layer 3 (see FIG. 1). The coextrusion further improves the interlayer adhesiveness, because heat applied during the coextrusion promotes the chemical reaction. Where the hose is formed into a bellows shape, the melt tube resulting from the coextrusion is passed through a corrugating machine to be thereby imparted with the bellows shape as having predetermined dimensions.

The resulting hose may be put in a thermal aging vessel, and subjected to an annealing process (heat treatment) under predetermined conditions (e.g., at 130° C. for 1 hour). The annealing process is preferred, because the annealing process increases the crystallinity of the PPS resin to improve the fuel permeation resistance.

The inventive automotive fuel hose preferably has a hose inner diameter of 2 to 40 mm, particularly preferably 2.5 to 36 mm, and a hose outer diameter of 3 to 44 mm, particularly preferably 4 to 40 mm. The innermost layer 1 typically has a thickness of 0.01 to 1.0 mm, preferably 0.05 to 0.6 mm. The inner layer 2 typically has a thickness of 0.02 to 1.0 mm, preferably 0.05 to 0.6 mm. The intermediate layer 3 preferably has a thickness of 0.02 to 0.8 mm, particularly preferably 0.05 to 0.6 mm. The outer layer 4 typically has a thickness of 0.2 to 1.5 mm, preferably 0.05 to 0.6 mm.

The layered structure of the automotive fuel hose is not limited to the four layer structure shown in FIG. 1, but may be a five layer structure such that an outermost layer is further provided on an outer peripheral surface of the outer layer 4.

Examples of a material (outermost layer material) for the outermost layer include polyamide resins and polyolefin resins, which may be used either alone or in combination.

The automotive fuel hose is advantageously used as a hose for transporting an automotive fuel such as gasoline, alcohol-containing gasoline, diesel fuel, biodiesel fuel, CNG (compressed natural gas) or LPG (liquefied petroleum gas), but not limited thereto. The hose may be used as a hose for transporting methanol, hydrogen, dimethyl ether (DME) or other automotive fuel, or as a hose such as an air conditioner hose for transporting a coolant.

In the automotive fuel hose, the interlayer adhesive strength between the inner layer 2 and the intermediate layer 3 in contact with the inner layer 2 (inner layer/intermediate layer adhesive strength) and the interlayer adhesive strength between the intermediate layer 3 and the outer layer 4 in contact with the intermediate layer 3 (intermediate layer/outer layer adhesive strength) are preferably not less than 40 N/cm. With interlayer adhesive strengths of not less than 40 N/cm, the inner layer/intermediate layer adhesiveness and the intermediate layer/outer layer adhesiveness are improved. Without the use of an adhesive layer, the automotive fuel hose is simpler in layered structure, and less costly.

The interlayer adhesive strengths are measured, for example, in the following manner. The fuel hose is longitudinally cut into four strips. By using one of the strips, the inner layer 2 and the intermediate layer 3 are separated from each other at their interface for the measurement of the interlayer adhesive strength (inner layer/intermediate layer adhesive strength). Similarly, the intermediate layer 3 and the outer layer 4 are separated from each other at their interface for the measurement of the interlayer adhesive strength intermediate layer/outer layer adhesive strength).

The automotive fuel hose preferably has a flexural stress of not greater than 45 N. With a flexural stress of not greater than 45 N, the hose is flexible and, therefore, easily bendable.

The flexural stress is determined, for example, in conformity with a three-point bending test specified by JIS K7171. In the test, a stress required to warp the hose by 10 mm is measured at a testing rate of 100 mm/min with a support point distance of 100 mm.

EXAMPLES

Next, inventive examples will be described in conjunction with comparative examples. However, the present invention is not limited to these inventive examples.

Prior to the inventive examples and the comparative examples, the following materials were prepared.

Innermost Layer Material

An ETFE modified with a carboxylic anhydride (FLUON AH-2000 Available from Asahi Glass Co., Ltd.)

An electrically conductive ETFE modified with a carboxylic anhydride (FLUON AH-3000 available from Asahi Glass Co., Ltd.)

Inner Layer Material and Outer Layer Material
An amine-modified PA 12 (GRILAMIDE L25A available from EMS Chemie AG)
Inner Layer Material and Outer Layer Material (for Comparative Examples)
A PA 12 (GRILAMIDE L25 available from EMS Chemie AG)
Intermediate Layer Material: PPS (A)
FORTRON KSP W214A available from Polyplastics Co., Ltd.
Intermediate Layer Material: Acid-Modified Polyolefin Resin (B)
An ethylene-α-olefin copolymer modified with maleic anhydride (TOUGHMER MH7020 available from Mitsui Chemicals, Inc.)
Intermediate Layer Material: Unmodified Polyolefin Resin (C)
An ethylene-α-olefin copolymer (TOUGHMER A4085S available from Mitsui Chemicals, Inc.)
Lower Fuel Permeability Layer Material: Epoxy Resin (D)
An o-cresol novolak epoxy resin (EOCN-104S available from Nippon Kayaku Co., Ltd.)

Example 1

Preparation of Intermediate Layer Material
First, 6 parts by weight (hereinafter referred to simply as "parts") of the acid-modified polyolefin resin (B), 6 parts of the unmodified polyolefin resin (C) and 3 parts of the epoxy resin (D) were added to 85 parts of the PPS (A), and thoroughly mixed together. Then, the resulting mixture was melt and kneaded at a temperature of 290° C. to 320° C. by means of a twin screw extruder. Thus, a lower fuel permeability material was prepared (in a pellet form).

Production of Fuel Hose
The materials were respectively extruded from an innermost layer extruder, an inner layer extruder, an intermediate layer extruder and an outer layer extruder into a single die, and the resulting product was passed through a sizing die, whereby a fuel hose including an innermost layer, an inner layer, an intermediate layer and an outer layer stacked in this order (and having an inner diameter of 6 mm and an outer diameter of 8 mm) was produced. Thereafter, the resulting hose was put in a thermal aging vessel, and subjected to an annealing process at 130° C. for 1 hour.

Examples 2 to 10 and Comparative Examples 1 to 9

Fuel hoses were each produced in substantially the same manner as in Example 1, except that the combination of the intermediate layer material, the inner layer material and the outer layer material was changed as shown in Tables 1 to 3.

TABLE 1

|  | Example (parts by weight) | | | | | | |
|---|---|---|---|---|---|---|---|
|  | 1 | 2 | 3 | 4 | 5 | 6 | 7 |
| Innermost layer | *1 | *1 | *1 | *1 | *1 | *1 | *1 |
| Inner layer | *2 | *2 | *2 | *2 | *2 | *2 | *2 |
| Intermediate layer | | | | | | | |
| PPS (A) | 85 | 83 | 75 | 82.5 | 81 | 81 | 79 |
| Acid-modified polyolefin resin (B) | 6 | 7 | 12 | 8 | 8 | 8 | 8 |
| Unmodified polyolefin resin (C) | 6 | 7 | 12 | 8 | 8 | 8 | 8 |
| Epoxy resin (D) | 3 | 3 | 3 | 1.5 | 2 | 3 | 5 |
| (B) + (C) | 12 | 14 | 24 | 16 | 16 | 16 | 16 |
| (B)/(C) (weight ratio) | 1/1 | 1/1 | 1/1 | 1/1 | 1/1 | 1/1 | 1/1 |
| Outer layer | *2 | *2 | *2 | *2 | *2 | *2 | *2 |
| Thickness (μm) | | | | | | | |
| Innermost layer | 100 | 100 | 100 | 100 | 100 | 100 | 100 |
| Inner layer | 100 | 100 | 100 | 100 | 100 | 100 | 100 |
| Lower fuel permeability layer | 200 | 200 | 200 | 200 | 200 | 200 | 200 |
| Outer layer | 600 | 600 | 600 | 600 | 600 | 600 | 600 |
| Gasoline permeability (mg/m/day) | <0.1 | <0.1 | <0.1 | <0.1 | <0.1 | <0.1 | <0.1 |
| Interlayer adhesive strength (N/cm) | | | | | | | |
| Inner layer/intermediate layer | 42 | 43 | 55 | 41 | 42 | 55 | 60 |
| Intermediate layer layer/outer layer | 43 | 44 | 57 | 42 | 44 | 56 | 61 |
| Flexural stress (N) | 45 | 45 | 43 | 44 | 43 | 43 | 43 |

*1: ETFE modified with carboxylic anhydride
*2: Amine-modified PA12

TABLE 2

|  | Example | | | Comparative Example | | | | (parts by weight) |
|---|---|---|---|---|---|---|---|---|
|  | 8 | 9 | 10 | 1 | 2 | 3 | 4 | |
| Innermost layer | *3 | *1 | *1 | *1 | *1 | *1 | *1 | |
| Inner layer | *2 | *2 | *2 | *2 | *2 | *2 | *2 | |
| Intermediate layer | | | | | | | | |
| PPS (A) | 81 | 81 | 81 | 87 | 67 | 83 | 78.5 | |
| Acid-modified polyolefin resin (B) | 8 | 12 | 4 | 5 | 14 | 8 | 8 | |

TABLE 2-continued

|  | Example | | | Comparative Example | | | | (parts by weight) |
| --- | --- | --- | --- | --- | --- | --- | --- | --- |
|  | 8 | 9 | 10 | 1 | 2 | 3 | 4 |
| Unmodified polyolefin resin (C) | 8 | 4 | 12 | 5 | 14 | 8 | 8 |
| Epoxy resin (D) | 3 | 3 | 3 | 3 | 3 | 1 | 5.5 |
| (B) + (C) | 16 | 16 | 16 | 10 | 28 | 16 | 16 |
| (B)/(C) (weight ratio) | 1/1 | 3/1 | 1/3 | 1/1 | 1/1 | 1/1 | 1/1 |
| Outer layer | *2 | *2 | *2 | *2 | *2 | *2 | *2 |
| Thickness (μm) | | | | | | | |
| Innermost layer | 100 | 100 | 100 | 100 | 100 | 100 | 100 |
| Inner layer | 100 | 100 | 100 | 100 | 100 | 100 | 100 |
| Lower fuel permeability layer | 200 | 200 | 200 | 200 | 200 | 200 | 200 |
| Outer layer | 600 | 600 | 600 | 600 | 600 | 600 | 600 |
| Gasoline permeability (mg/m/day) | <0.1 | <0.1 | <0.1 | <0.1 | 0.15 | <0.1 | 0.2 |
| Interlayer adhesive strength (N/cm) | | | | | | | |
| Inner layer/intermediate layer | 55 | 48 | 42 | 30 | 60 | 10 | 53 |
| Intermediate layer/outer layer | 56 | 49 | 43 | 32 | 62 | 13 | 55 |
| Flexural stress (N) | 43 | 45 | 43 | 46 | 42 | 43 | 45 |

*1: ETFE modified with carboxylic anhydride
*2: Amine-modified PA12
*3: Electrically conductive ETFE modified with carboxylic anhydride

TABLE 3

|  | Comparative Example | | | | | (parts by weight) |
| --- | --- | --- | --- | --- | --- | --- |
|  | 5 | 6 | 7 | 8 | 9 |
| Innermost layer | *1 | *1 | *1 | *1 | *1 |
| Inner layer | *2 | *2 | PA12 | *2 | *2 |
| Intermediate layer | | | | | |
| PPS (A) | 81 | 81 | 81 | 82 | 82 |
| Acid-modified polyolefin resin (B) | 16 | — | 8 | 12 | 3 |
| Unmodified polyolefin resin (C) | — | 16 | 8 | 3 | 12 |
| Epoxy resin (D) | 3 | 3 | 3 | 3 | 3 |
| (B) + (C) | 16 | 16 | 16 | 15 | 15 |
| (B)/(C) (weight ratio) | 16/0 | 0/16 | 1/1 | 4/1 | 1/4 |
| Outer layer | *2 | *2 | PA12 | *2 | *2 |
| Thickness (μm) | | | | | |
| Innermost layer | 100 | 100 | 100 | 100 | 100 |
| Inner layer | 100 | 100 | 100 | 100 | 100 |
| Lower fuel permeability layer | 200 | 200 | 200 | 200 | 200 |
| Outer layer | 600 | 600 | 600 | 600 | 600 |
| Gasoline permeability (mg/m/day) | <0.1 | <0.1 | <0.1 | <0.1 | <0.1 |
| Interlayer adhesive strength (N/cm) | | | | | |
| Inner layer/intermediate layer | 55 | 39 | 10 | 46 | 38 |
| Intermediate layer/outer layer | 56 | 39 | 11 | 48 | 39 |
| Flexural stress (N) | 48 | 41 | 43 | 47 | 43 |

*1: ETFE modified with carboxylic anhydride
*2: Amine-modified PA12

The fuel hoses of the inventive examples and the comparative examples thus produced were evaluated for various properties based on the following criteria. The results are also shown in Tables 1 to 3.

Gasoline Permeability

Opposite end portions of a 10 meter long fuel hose (having an inner diameter of 6 mm) were each expanded to an inner diameter of 10 mm by means of a cone-shaped jig. Then, two metal pipes were prepared which each had an outer diameter of 8 mm and had end portions each having a rounded outer periphery (and two bulged portions each having an outer diameter of 10 mm). These metal pipes were respectively press-fitted into the opposite end portions of the fuel hose. A blind cap was threadingly attached to one of the metal pipes, and a metal valve was attached to the other metal pipe. Thereafter, Indolene gasoline containing 10 vol % of ethanol was supplied into the fuel hose through the metal pipe provided with the metal valve, and the fuel hose was sealed. The fuel hose was allowed to stand at 40° C. for 3000 hours (the Indolene gasoline containing 10 vol % of ethanol was changed every week). Then, fuel permeation was measured for three days on the basis of a DBL pattern by the CARB SHED method. Fuel permeation per meter of the fuel hose was determined on a day when the maximum fuel permeation was detected. In Tables 1 to 3, the notation "<0.1" indicates that the measured fuel permeation was lower than 0.1 mg/m/day which is the measurement limitation of the aforesaid measurement method.

Interlayer Adhesive Strength

The fuel hoses were each longitudinally cut into four strips. By using one of the strips, the inner layer and the intermediate layer were separated from each other at their interface for measurement of interlayer adhesive strength (inner layer/intermediate layer adhesive strength) (N/cm). Similarly, the intermediate layer and the outer layer were separated from each other at their interface for measurement of interlayer adhesive strength (intermediate layer/outer layer adhesive strength). A fuel hose having interlayer adhesive strengths of not less than 40 N/cm was regarded as having excellent interlayer adhesiveness.

Flexural Stress

In conformity with a three-point bending test specified by JIS K7171, a stress required to warp each of the fuel hoses by 10 mm was measured at a testing rate of 100 mm/min with a support point distance of 100 mm. The flexural stress is an index of bending workability. A fuel hose having a smaller flexural stress is more flexible and, therefore, more easily bendable. A fuel hose having a flexural stress of not greater than 45 N was regarded as having excellent flexibility.

The results shown in Tables 1 to 3 indicate that the fuel hoses of the inventive examples were superior in gasoline permeation resistance and interlayer adhesiveness, and excellent in flexibility with lower flexural stresses.

In contrast, the fuel hose of Comparative Example 1, in which the total proportion of the acid-modified polyolefin resin (B) and the unmodified polyolefin resin (C) was 10 parts which was too small, was poorer in interlayer adhesiveness and flexibility. The fuel hose of Comparative Example 2, in which the proportions of the acid-modified polyolefin resin (B) and the unmodified polyolefin resin (C) was too great, was poorer in gasoline permeation resistance. The fuel hose of Comparative Example 3, in which the proportion of the epoxy resin (D) was too small, was poorer in interlayer adhesiveness. The fuel hose of Comparative Example 4, in which the proportion of the epoxy resin (D) was too great, was poorer in gasoline permeation resistance. The fuel hose of Comparative Example 5, in which the proportion of the acid-modified polyolefin resin (B) was too great and no unmodified polyolefin resin (C) was blended, was poorer in flexibility. The fuel hose of Comparative Example 6, in which the proportion of the unmodified polyolefin resin (C) was too great and no acid-modified polyolefin resin (B) was blended, was poorer in interlayer adhesiveness. The fuel hose of Comparative Example 7, in which the inner layer and the outer layer were each formed of the unmodified PA12, was poorer in interlayer adhesiveness with the inner layer/intermediate layer adhesive strength and the intermediate layer/outer layer adhesive strength being lower. The fuel hose of Comparative Example 8, in which the proportion of the flexible unmodified polyolefin resin (C) was smaller with the mixing weight ratio of the acid-modified polyolefin resin (B) to the unmodified polyolefin resin (C) being (B)/(C)=4/1, was poorer in flexibility. The fuel hose of Comparative Example 9, in which the proportion of the acid-modified polyolefin resin (B) effective for imparting the hose with adhesiveness was smaller with the mixing weight ratio of the acid-modified polyolefin resin (B) to the unmodified polyolefin resin (C) being (B)/(C)=1/4, was poorer in interlayer adhesiveness.

The automotive fuel hose is advantageously used as a hose for transporting an automotive fuel such as gasoline, alcohol-containing gasoline, diesel fuel, biodiesel fuel, CNG (compressed natural gas) or LPG (liquefied petroleum gas).

Although specific forms of the embodiments of the instant invention have been described above and illustrated in the accompanying drawing in order to be more clearly understood, the above description is made by way of example and not as a limitation to the scope of the instant invention. It is contemplated that various modifications apparent to one of ordinary skill in the art could be made without departing from the scope of the invention.

The invention claimed is:

1. An automotive fuel hose, comprising:
a tubular innermost layer of a fluororesin;
an inner layer provided on an outer peripheral surface of the innermost layer;
an intermediate layer provided on the inner layer; and
an outer layer provided on the intermediate layer,
wherein the inner layer and the outer layer are each composed of an amine-modified polyamide resin,
wherein the intermediate layer is composed of a resin composition including:
(A) a polyphenylenesulfide resin;
(B) 4 to 12 wt % of a modified polyolefin resin;
(C) 4 to 12 wt % of an unmodified polyolefin resin; and
(D) 1.5 to 5 wt % of an epoxy resin,
wherein the modified polyolefin resin (B) and the unmodified polyolefin resin (C) are present in a total proportion of 12 to 24 wt % in a weight ratio of (B)/(C)=3/1 to 1/3 in the resin composition, and
wherein the intermediate layer is bonded to the inner layer and the outer layer through a chemical reaction.

2. The automotive fuel hose as set forth in claim 1, wherein the modified polyolefin resin (B) is at least one of an ethylene-α-olefin copolymer modified with maleic anhydride and an ethylene-α-olefin copolymer modified with maleic acid.

3. The automotive fuel hose as set forth in claim 1, wherein the unmodified polyolefin resin (C) is an ethylene-α-olefin copolymer.

4. The automotive fuel hose as set forth in claim 1, wherein the epoxy resin (D) is an o-cresol novolak epoxy resin.

5. The automotive fuel hose as set forth in claim 1, wherein the fluororesin for the innermost layer is a fluororesin having a functional group.

6. The automotive fuel hose as set forth in claim 1, wherein the inner layer, the intermediate layer and the outer layer are formed by coextrusion.

* * * * *